(12) United States Patent
Yamada et al.

(10) Patent No.: US 8,423,486 B2
(45) Date of Patent: Apr. 16, 2013

(54) LEARNING DEVICE

(75) Inventors: Naoyuki Yamada, Kariya (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 412 days.

(21) Appl. No.: 12/817,266

(22) Filed: Jun. 17, 2010

(65) Prior Publication Data
US 2010/0324702 A1 Dec. 23, 2010

(30) Foreign Application Priority Data
Jun. 19, 2009 (JP) ................................ 2009-147013

(51) Int. Cl.
*G06F 15/18* (2006.01)

(52) U.S. Cl.
USPC ......................................................... 706/12

(58) Field of Classification Search ..................... 706/12
See application file for complete search history.

(56) References Cited

U.S. PATENT DOCUMENTS

| | | | | |
|---|---|---|---|---|
| 7,149,595 B2 * | 12/2006 | D'Mura | ........................... | 700/96 |
| 7,460,944 B2 * | 12/2008 | Baumann et al. | ................ | 701/53 |
| 7,545,986 B2 * | 6/2009 | Bachmann | ..................... | 382/224 |
| 7,792,631 B2 * | 9/2010 | Bottcher et al. | .............. | 701/108 |
| 8,116,967 B2 * | 2/2012 | Bottcher et al. | .............. | 701/115 |
| 2009/0063013 A1 | 3/2009 | Nakata et al. | | |

FOREIGN PATENT DOCUMENTS

| | | |
|---|---|---|
| JP | H5-189572 | 7/1993 |
| JP | H7-37095 | 2/1995 |
| JP | H7-225749 | 8/1995 |
| JP | H8-297649 | 11/1996 |
| JP | H10-283336 | 10/1998 |
| JP | 2007-278168 | 10/2007 |
| JP | 2008-117090 | 5/2008 |

OTHER PUBLICATIONS

Japanese Office Action dated Jun. 7, 2011, issued in corresponding Japanese Application No. 2009-147013 with English Translation.
U.S. Appl. No. 12/797,070, Yoshida, filed Jun. 9, 2010.
U.S. Appl. No. 12/814,777, Sugiyama et al, filed Jun. 14, 2010.
U.S. Appl. No. 12/813,731, Yamada, filed Jun. 11, 2010.
U.S. Appl. No. 12/796,890, Komatsu, filed Jun. 9, 2010.
U.S. Appl. No. 12/796,904, Sugiyama et al, filed Jun. 9, 2010.
U.S. Appl. No. 12/817,286, Nakata et al, filed Jun. 17, 2010.
U.S. Appl. No. 12/796,845, Takashima, filed Jun. 9, 2010.
Office Action (5 pages) dated Dec. 5, 2012 in corresponding Chinese Application No. 201010208599.X and English translation (3 pages).

* cited by examiner

*Primary Examiner* — Michael B Holmes
(74) *Attorney, Agent, or Firm* — Nixon & Vanderhye P.C.

(57) ABSTRACT

A learning device learns a control parameter (e.g., injection start response delay), which is used for deciding a control content of an injector (controlled object), in relation to a criterion variable (e.g., fuel pressure). The learning device has a storing section for storing a learning vector consisting of the control parameter and the criterion variable. The learning device has a measurement vector obtaining section for obtaining a measurement vector consisting of a measurement value of the control parameter and a measurement value of the criterion variable. The learning device has a correcting section for correcting the learning vector based on the measurement vector and for performing storing and updating of the learning vector in the storing section.

19 Claims, 5 Drawing Sheets

LEARNING DEVICE

CROSS REFERENCE TO RELATED APPLICATION

This application is based on and incorporates herein by reference Japanese Patent Application No. 2009-147013 filed on Jun. 19, 2009.

BACKGROUND OF THE INVENTION

1. Field of the Invention

The present invention relates to a learning device that learns a control parameter, which is used for deciding a control content of a controlled object, in relation to a criterion variable.

2. Description of Related Art

As an example of this kind of learning device, there is a device that measures an injection start delay td since an injection command is outputted to an injector of an internal combustion engine until injection is actually performed and that performs learning by storing and updating a measurement value of the injection start delay td as a control parameter of each injector (for example, refer to Patent document 1: JP-A-2009-57924). Timing for outputting the injection command and the like are controlled by using the delay td stored and updated in this way.

The above-described delay td takes different values according to fuel pressure supplied to the injector (i.e., fuel pressure as of injection start timing). Therefore, the inventors of the present invention examined learning the delay td (control parameter) in relation to the fuel pressure (criterion variable) as follows. In an example of FIG. 7A, delays td(30), td(50), td(80) corresponding to specific values of the fuel pressure (30 MPa, 50 MPa, 80 MPa in example of FIG. 7A) are stored and updated as learning values. For example, when the measured delay is indicated by a point A0 in FIG. 7A, the learning value td(50) closest to the point A0 is updated by linear interpolation. More specifically, an intersection point between a straight line L, which connects the learning value td(30) and the measurement value A0, and the fuel pressure of 50 MPa is used as the updated learning value td(50).

However, if a characteristic expressing a relationship between the fuel pressure and the delay td is not a straight line but a curve line (refer to curve line R in FIG. 7B) and points A1, A2, A3 on the curve line R are measured repeatedly, the learning value td(50) is updated sequentially from B1 to B2 and then to B3 when the above-mentioned linear interpolation is performed. That is, the learning value td(50) repeats increase or decrease and hunts. Even if the characteristic expressing the relationship between the fuel pressure and the delay td is the straight line, the learning value td(50) provided by the linear interpolation based on the learning value td(30) also hunts when the present learning value td(30) has deviated from a true characteristic value.

SUMMARY OF THE INVENTION

It is an object of the present invention to provide a learning device aiming to avoid hunting of a learning value.

According to a first example aspect of the present invention, a learning device learns a control parameter, which is used for deciding a control content of a controlled object, in relation to a criterion variable. The learning device has a storing section for storing at least one learning vector consisting of the control parameter and the criterion variable. The learning device has a measurement vector obtaining section for obtaining a measurement vector consisting of a measurement value of the control parameter and a measurement value of the criterion variable. The learning device has a correcting section for correcting the learning vector based on the measurement vector and for performing storing and updating of the learning vector in the storing section.

According to the above-described aspect of the present invention, the control parameter corresponding to a specific value of the criterion variable is not stored. Rather, the learning vector consisting of the control parameter and the criterion variable is stored according to the above-described aspect of the present invention. The learning vector is corrected based on the measurement vector consisting of the measurement value of the control parameter and the measurement value of the criterion variable. Therefore, even if the characteristic expressing the relationship between the criterion variable and the control parameter is not the straight line but the curve line, the hunting of the stored and updated values of the learning vector can be inhibited.

In this way, the learning vector is corrected based on the measurement vector. Therefore, even when the learning vector before the updating has deviated from the true characteristic values in the case where the characteristic is the straight line, the updated learning vector gradually approximates to the true values as the learning is repeated. Therefore, also in this case, the hunting of the stored and updated values of the learning vector can be inhibited.

According to a second example aspect of the present invention, the correcting section includes a correction vector calculating section for calculating a correction vector by multiplying a difference between the obtained measurement vector and the learning vector by a predetermined ratio. The correcting section performs the storing and the updating of the learning vector by adding the correction vector to the learning vector yet to be learned.

With the above-described aspect of the present invention, speed and accuracy of the approximation of the learning vector to the true values due to the repetition of the storing and the updating can be adjusted by adjusting the predetermined ratio. For example, when it is assumed that the learning vector has deviated largely from the true values, it is desirable to set the predetermined ratio to be large to prioritize the approximation speed. When it is assumed that the deviation of the learning vector from the true values is small, it is desirable to set the predetermined ratio to be small to reduce an influence of measurement errors in the measurement values and to prioritize the approximation accuracy.

According to a third example aspect of the present invention, the predetermined ratio is set variably in accordance with a time number of the learning.

It is assumed that the learning vector has approximated to the true values more as the learning time number increases. Therefore, for example, when the storing and the updating of the learning vector having a relatively large learning time number among the multiple learning vectors are performed, the predetermined ratio should be preferably set small. When the storing and the updating of the learning vector having a relatively small learning time number are performed, the predetermined ratio should be preferably set large.

According to a fourth example aspect of the present invention, the predetermined ratio is set variably in accordance with an elapsed time after the controlled object is started up.

It is assumed that the time number of the learning increases as the elapsed time lengthens. Therefore, it can be assumed that the learning vector has approximated to the true values more as the elapsed time lengthens. Therefore, the predetermined ratio should be preferably reduced as the elapsed time lengthens.

According to a fifth example aspect of the present invention, a map area using the control parameter and the criterion variable as axes is segmented into a plurality of regions. One of the learning vectors is assigned to each of the segmented regions. The correcting section corrects the learning vector of the region corresponding to the obtained measurement vector, thereby performing the storing and the updating of the learning vector.

According to a sixth example aspect of the present invention, the plurality of regions are segmented at different intervals according to a distribution profile of the learning vectors in the map area.

For example, it is desirable to set the interval in a region, where the distribution profile of the learning vector is a curve line, to be smaller than in another region where the distribution profile is a straight line. Thus, the storing and the updating of the learning vector can be performed finely in the region of the curve line distribution profile.

According to a seventh example aspect of the present invention, the plurality of regions are segmented at different intervals according to frequencies of use of the learning vectors in the decision of the control content.

For example, it is desirable to set the interval in a region, where the use frequency is high, to be smaller than in another region where the use frequency is low. Thus, the storing and the updating of the (earning vector can be performed finely in the region of the high use frequency.

According to an eighth example aspect of the present invention, the plurality of regions are segmented at equal intervals. Thus, the processing load of the learning device can be reduced as compared to the case where the regions are segmented at the different intervals as in the sixth or seventh example aspect of the present invention.

According to a ninth example aspect of the present invention, the correcting section corrects the learning vector closest to the obtained measurement vector to perform the storing and the updating of the learning vector in a map area that uses the control parameter and the criterion variable as axes.

According to a tenth example aspect of the present invention, the number of the learning vectors is set variably in a map area that uses the control parameter and the criterion variable as axes.

According to an eleventh example aspect of the present invention, the number of the learning vectors is set variably according to a distribution profile of the learning vectors in the map area.

For example, it is desirable to set the number of the learning vectors in a region, where the distribution profile of the learning vector is the curve line, to be larger than in another region where the distribution profile is the straight line. Thus, the storing and the updating of the learning vector can be performed finely in the region of the curve line distribution profile.

According to a twelfth example aspect of the present invention, the number of the learning vectors is set variably according to frequencies of use of the learning vectors in the decision of the control content.

For example, it is desirable to set the number of the learning vectors in a region, where the use frequency is high, to be larger than in another region where the use frequency is low. Thus, the storing and the updating of the learning vector can be performed finely in the region of the high use frequency.

According to a thirteenth example aspect of the present invention, when a distance between the adjacent learning vectors is equal to or smaller than a predetermined value, either one of the adjacent learning vectors is erased.

According to the above-described aspect of the present invention, when the distance between the adjacent learning vectors is short, it is assumed that the number of the learning vectors is more than necessity, and either one of the adjacent learning vectors is erased. Therefore, the necessary or used storage capacity of the storing section can be reduced.

According to a fourteenth example aspect of the present invention, when a distance between the adjacent learning vectors is equal to or smaller than a predetermined value, a new learning vector is added between the adjacent learning vectors.

According to the above-described aspect of the present invention, when the distance between the adjacent learning vectors is short, it is assumed that the measurement frequency of the control parameter is high and the use frequency is high in the region, and the new learning vector is added. Therefore, the learning vector can be stored and updated finely in the region of the high use frequency.

According to a fifteenth example aspect of the present invention, the learning of the learning vector, whose storing and updating have been performed by a predetermined time number or over, is ended.

It is assumed that the learning vector having the large time number of the storing and the updating has approximated to the true values sufficiently. Therefore, the learning of such the learning vector is ended according to the above-described aspect of the present invention. Accordingly, the excessive time number of the learning can be avoided and the processing load of the learning device can be reduced.

According to a sixteenth example aspect of the present invention, the learning of all the learning vectors is ended when a learning period of the learning vectors exceeds a predetermined period.

It is assumed that all the learning vectors have approximated to the true values sufficiency when the learning period is long. Therefore, according to the above-described aspect of the present invention, the learning is ended in such the case, whereby the excessive time number of the learning can be avoided and the processing load of the learning device can be reduced.

According to a seventeenth example aspect of the present invention, a value of the control parameter corresponding to a specific value of the criterion variable is calculated by linear interpolation based on the learning vector, whose learning has been completed. A control map is produced by relating the calculated value to the specific value. The control content is decided using the control parameter stored in the control map.

According to the above-described aspect of the present invention, the hunting of the learning vector is inhibited by storing the learning vector consisting of the control parameter and the criterion variable until the learning ends. In addition, after the learning ends, the control parameter corresponding to the specific value of the criterion variable is produced as the control map and is used for the control. Therefore, the present invention can be suitably used when the control parameter corresponding to the specific value is required in the control of the controlled object.

According to an eighteenth example aspect of the present invention, a control map is produced by relating a value of the control parameter of the learning vector, whose learning has been completed, to the criterion variable of the same learning vector. The control content is decided using the control parameter stored in the control map.

According to the above-described aspect of the present invention, the control map is produced by using the value of the control parameter of the learned learning vector as it is. Therefore, the present invention can be suitably used when the control parameter corresponding to the specific value is not required in the control of the controlled object.

According to a nineteenth example aspect of the present invention, the learning vector is a vector of three or more dimensions consisting of a plurality of control parameters and the criterion variable.

According to the above-described aspect of the present invention, when the multiple control parameters are used, it is only required to increase the dimension of the learning vector and to increase the dimension of the calculation formula for correcting the learning vector based on the measurement vector. Accordingly, the present invention can be applied to the multiple control parameters without necessitating a significant program change.

According to a twentieth example aspect of the present invention, the controlled object is an injector that injects fuel used for combustion in an internal combustion engine. A fuel pressure sensor for sensing fuel pressure is mounted to the injector. The measurement vector obtaining section obtains a parameter, which quantifies an injection characteristic of the injector, as the control parameter based on a sensing value of the fuel pressure sensor.

An example of the above-described control parameter is an injection start delay td explained below. The sensed pressure of the fuel pressure sensor starts decreasing when the injection starts. Therefore, actual injection start timing can be detected by detecting decrease start timing of the sensed pressure. Therefore, the delay td since an injection command signal is outputted to the injector until the actual injection start is detected can be sensed. The delay td changes according to the fuel pressure as of the injection start timing. Therefore, the delay td (control parameter) is learned in relation to the fuel pressure (criterion variable), and output timing of the injection command signal is controlled based on the learned delay td.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, embodiments of a learning device according to the present invention will be described with reference to the drawings. The learning device according to each of the embodiments explained below is mounted in an engine (internal combustion engine) for a vehicle. A diesel engine that injects high-pressure fuel and causes compression self-ignition combustion of the fuel in multiple cylinders #1 to #4 is assumed as the engine.

(First Embodiment)

Figure 1:
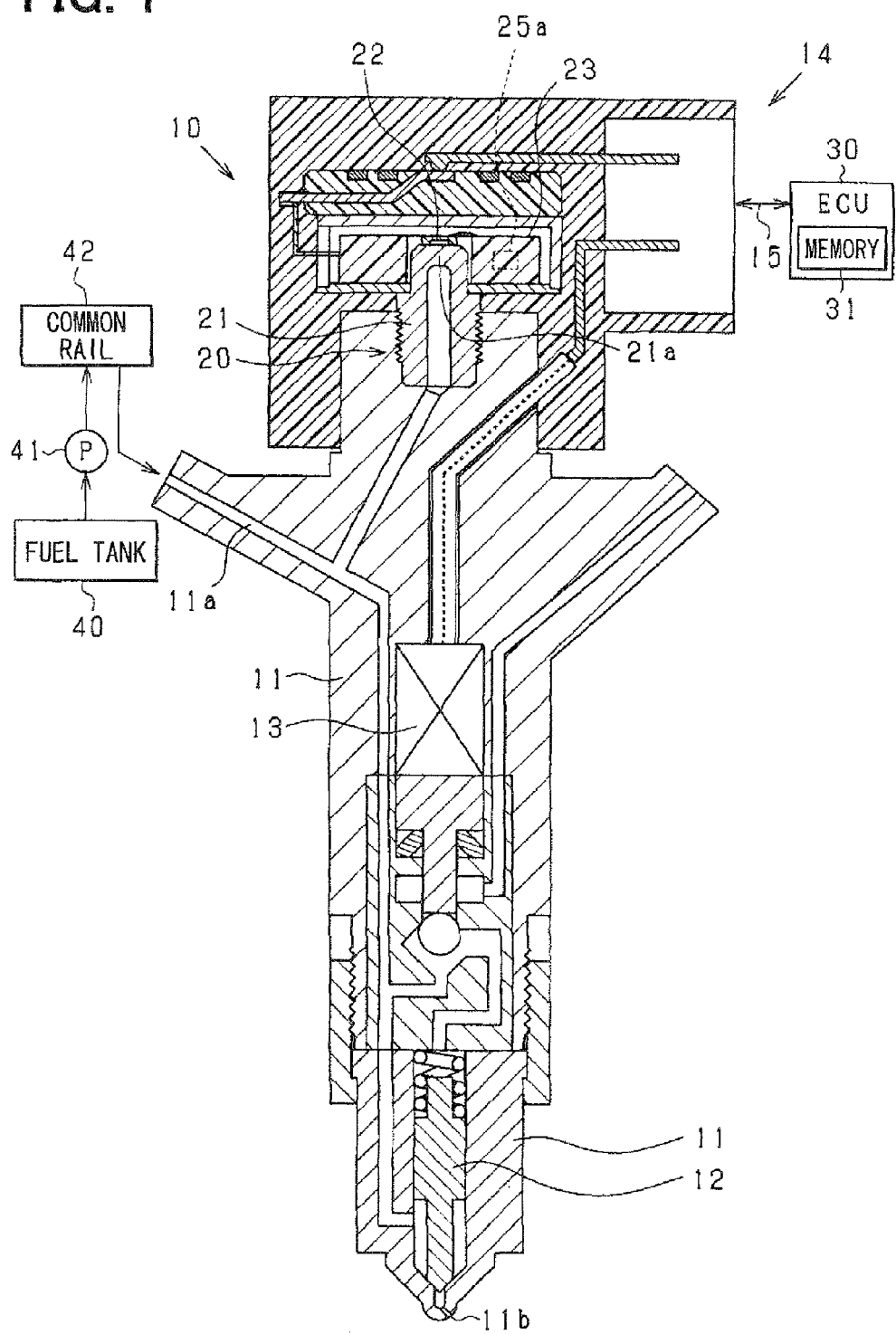
FIG. 1 is a schematic diagram showing an injector as a controlled object of a learning device according to a first embodiment of the present invention.

FIG. 1 is a schematic diagram showing an injector 10 (controlled object) mounted in each cylinder of the engine, a fuel pressure sensor 20 mounted in the injector 10, an ECU 30 as an electronic control device (control device) mounted in the vehicle and the like.

First, a fuel injection system of the engine including the injector 10 will be explained. Fuel in a fuel tank 40 is pumped by a high-pressure pump 41 to a common rail 42 (pressure accumulator) and is accumulated in the common rail 42. The accumulated fuel is distributed and supplied to the injectors 10 of the respective cylinders.

The injector 10 has a body 11, a needle 12 (valve member), an actuator 13 and the like as explained below. The body 11 defines a high-pressure passage 11a inside and an injection hole 11b for injecting the fuel. The needle 12 is accommodated in the body 11 and opens and closes the injection hole 11b. The actuator 13 causes the needle 12 to perform the opening-closing operation.

The ECU 30 controls drive of the actuator 13 to control the opening-closing operation of the needle 12. Thus, the high-pressure fuel supplied from the common rail 42 to the high-pressure passage 11a is injected from the injection hole 11b in accordance with the opening-closing operation of the needle 12. For example, the ECU 30 calculates injection modes such as injection start timing, injection end timing and an injection quantity based on rotation speed of an engine output shaft, an engine load and the like. The ECU 30 controls the drive of the actuator 13 to realize the calculated injection modes.

Next, a hardware construction of the fuel pressure sensor 20 will be explained.

The fuel pressure sensor 20 has a stem 21 (strain element), a pressure sensor element 22, a mold IC 23 and the like as explained below. The stem 21 is fixed to the body 11. A diaphragm section 21a formed in the stem 21 receives pressure of the high-pressure fuel flowing through the high-pressure passage 11a and deforms elastically.

The pressure sensor element 22 is fixed to the diaphragm section 21a. The pressure sensor element 22 outputs a pressure sensing signal according to an amount of the elastic deformation caused in the diaphragm section 21a. The mold IC 23 is formed by molding electronic components such as an amplifying circuit that amplifies the pressure sensing signal outputted from the pressure sensor element 22 and EEPROM 25a as a rewritable nonvolatile memory with a resin. The mold IC 23 is mounted in the injector 10 together with the stem 21. A connector 14 is provided in an upper portion of the body 11. The mold IC 23 and the actuator 13 are electrically connected with the ECU 30 through a harness 15 connected to the connector 14.

If the fuel injection from the injection hole 11b is started, the pressure of the fuel (fuel pressure) in the high-pressure passage 11a decreases. The fuel pressure rises if the fuel injection is ended. That is, a change of the fuel pressure is correlated with a change of an injection rate (injection quantity injected per unit time). Accordingly, the injection rate change can be estimated from the fuel pressure change. Therefore, in the present embodiment, an injection rate model is calculated by sensing the fuel pressure change, and the actual injection rate change with respect to the injection command signal is estimated using the injection rate model. Then, an injection command signal is set in consideration of the estimated injection rate change. Thus, the injection control is performed to achieve a desired injection rate change.

Therefore, it is required to calculate injection rate model parameters (control parameters) necessary for producing the injection rate model based on the sensed pressure sensed with the fuel pressure sensor 20 and to store the injection rate model parameters. Further, it is required to perform learning by storing and updating the injection rate model parameters every time the injection rate model parameters are calculated. If the fuel pressure that is supplied to the injector 10 (i.e., fuel pressure in common rail 42) and that is sensed with the fuel pressure sensor 20 at the injection start timing differs, the injection rate model parameters also take different values. Therefore, in the present embodiment, the injection rate model parameters are learned in relation to the fuel pressure as of the injection start (i.e., criterion variable).

Hereafter, the above-described injection rate model parameters calculated from obtained fuel pressure change will be explained using FIG. 2.

Figure 2:
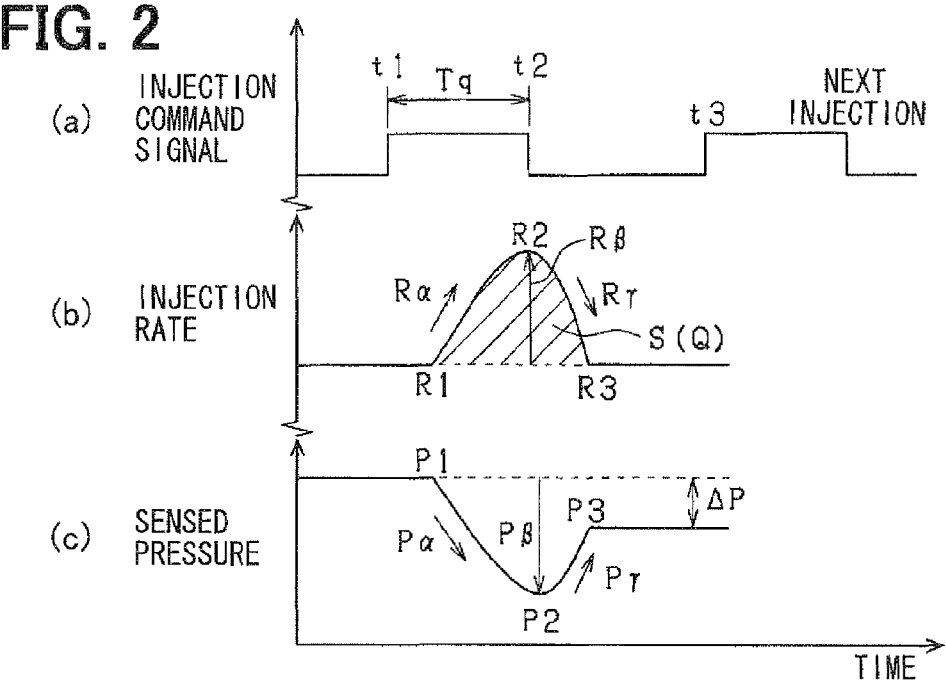
FIG. 2 is a time chart showing an injection command signal, an injection rate and sensed pressure according to the first embodiment.

Part (a) of FIG. 2 shows an injection command signal outputted from the ECU 30 to the actuator 13 of the injector 10. Due to pulse-on of the command signal, the actuator 13 operates and the injection hole 11b opens. That is, the injection start is commanded at pulse-on timing t1 of the injection command signal, and an injection end is commanded at pulse-off timing t2. Therefore, an injection quantity Q is controlled by controlling a valve opening time Tq of the injection hole 11b with a pulse-on period of the command signal (i.e., injection command period).

Part (b) of FIG. 2 shows a change (transition) of the fuel injection rate from the injection hole 11b occurring with the above-described injection command. Part (c) of FIG. 2 shows a change (fluctuation waveform) of the sensed pressure occurring with the change of the injection rate. The fluctuation of the sensed pressure is correlated with the change of the injection rate as explained below. Therefore, a transition waveform of the injection rate can be estimated from the fluctuation waveform of the sensed pressure.

That is, after the timing t1 when the injection start command is outputted as shown in part (a) of FIG. 2, the injection rate starts increasing at timing R1 and the injection is started. As the injection rate starts increasing at the timing R1, the sensed pressure starts decreasing at a changing point P1. Then, as the injection rate reaches the maximum injection rate at timing R2, the decrease of the sensed pressure stops at a changing point P2. Then, as the injection rate starts decreasing at timing R2, the sensed pressure starts increasing at a changing point P2. Then, as the injection rate becomes zero and the actual injection ends at timing R3, the increase of the sensed pressure stops at a changing point P3.

Thus, the increase start timing R1 (actual injection start timing) and the decrease end timing R3 (actual injection end timing) of the injection rate can be calculated by detecting the changing points P1 and P3 in the fluctuation of the sensed pressure sensed by the fuel pressure sensor 20. Moreover, the change of the injection rate can be estimated from the fluctuation of the sensed pressure based on the correlation between the fluctuation of the sensed pressure and the change of the injection rate as explained below.

That is, there is a correlation between a pressure decrease rate $P\alpha$ from the changing point P1 to the changing point P2 of the sensed pressure and an injection rate increase rate $R\alpha$ from the changing point R1 to the changing point R2 of the injection rate. There is a correlation between a pressure increase rate $P\gamma$ from the changing point P2 to the changing point P3 and an injection rate decrease rate $R\gamma$ from the changing point R2 to the changing point R3. There is a correlation between a pressure decrease amount $P\beta$ (maximum drop amount) from the changing point P1 to the changing point P2 and an injection rate increase amount $R\beta$ from the changing point R1 to the changing point R2. Accordingly, the injection rate increase rate $R\alpha$, the injection rate decrease rate $R\gamma$, and the injection rate increase amount $R\beta$ of the injection rate can be calculated by sensing the pressure decrease rate $P\alpha$, the pressure increase rate $P\gamma$, and the pressure decrease amount $P\beta$ from the fluctuation of the sensed pressure. As described above, the various states R1, R3, $R\alpha$, $R\beta$ and $R\gamma$ of the injection rate can be calculated, and eventually, the change (transition waveform) of the fuel injection rate shown in part (b) of FIG. 2 can be estimated.

An integration value of the injection rate from the actual injection start to the actual injection end (i.e., shaded area indicated by mark S in part (b) of FIG. 2) corresponds to the injection quantity. An integration value of the pressure in a portion of the fluctuation waveform of the sensed pressure corresponding to the change of the injection rate from the actual injection start to the actual injection end (i.e., portion from changing point P1 to changing point P3) is correlated with the integration value S of the injection rate. Therefore, the injection rate integration value S equivalent to the injection quantity Q can be calculated by calculating the pressure integration value from the fluctuation of the sensed pressure.

Relationships between the pulse-on timing t1, the pulse-off timing t2 and the pulse-on period Tq of the injection command signal and the various states R1, R3, $R\alpha$, $R\beta$, $R\gamma$ and the injection quantity Q are stored and updated in the EEPROM 25a (storage device) as the injection rate model parameters.

More specifically, td, te, dqmax and the like explained below are learned as the injection rate model parameters. That is, a time from the pulse-on timing t1 to the actual injection start timing R1 is learned as an injection start response delay td. A deviation between the valve opening time Tq based on the injection command and an actual injection time extending from R1 to R3 is learned as an injection time deviation te. A ratio between the valve opening time Tq based on the injection command and the injection rate increase amount R13 is learned as an increase amount ratio dqmax.

Fundamentally, the microcomputer of the ECU 30 calculates a request injection quantity and request injection timing based on an engine load, which is calculated from an accelerator operation amount and the like, and engine rotation speed. Then, the microcomputer sets the injection command signal (t1, t2, Tq) to satisfy the request injection quantity and the request injection timing by using the injection rate model calculated from the learned injection rate model parameters. Thus, the microcomputer controls a fuel injection state (injection timing, injection quantity and the like).

Figure 3:
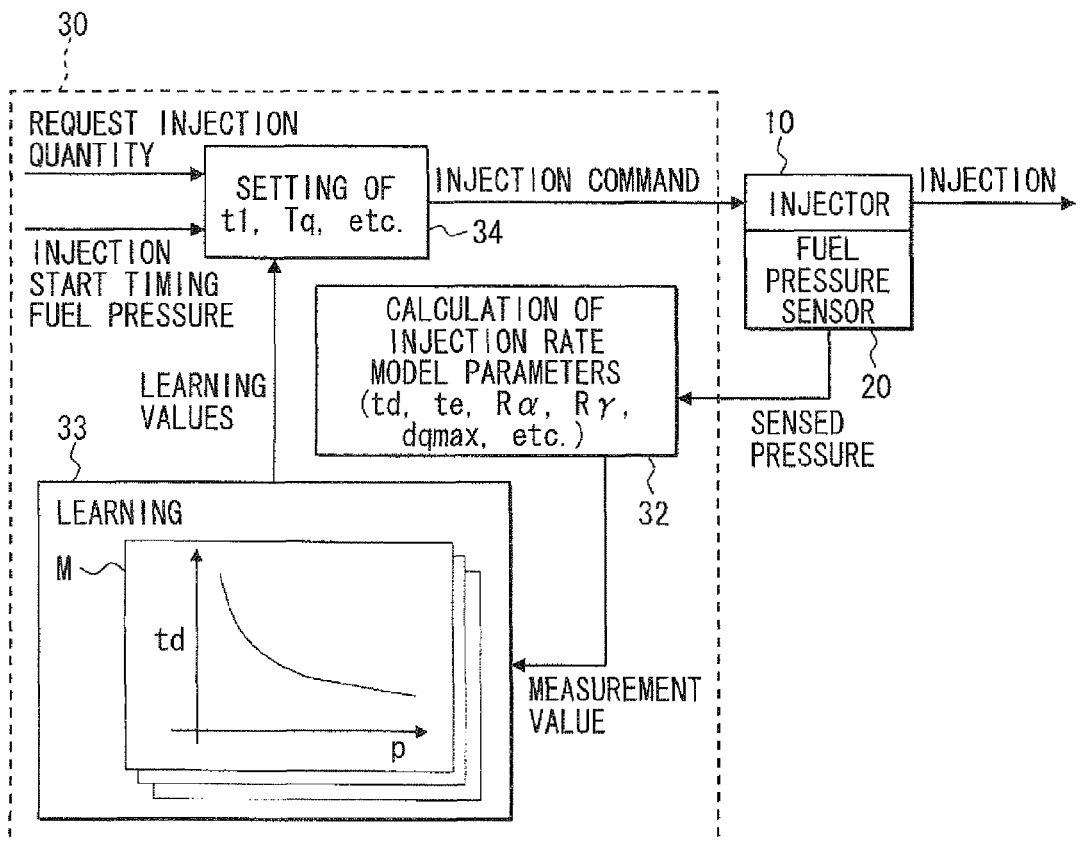
FIG. 3 is a block diagram showing processing contents for controlling the injector according to the first embodiment.

FIG. 3 is a block diagram showing contents of processing (control contents) for controlling the injector 10 with the microcomputer of the ECU 30. The microcomputer has functions as a parameter calculating section 32 (measurement vector obtaining section), a learning section 33 and an injection command signal setting section 34 explained below.

First, the ECU 30 obtains the sensed pressure (refer to part (c) of FIG. 2) from the fuel pressure sensor 20. The parameter calculating section 32 calculates various kinds of injection rate model parameters (such as td, te and dqmax) mentioned above based on the obtained sensed pressure. The parameters can be regarded as measurement values measured with the fuel pressure sensor 20. In addition, the fuel pressure p as of the injection start (P1 in part (c) of FIG. 2) is read based on the obtained sensed pressure.

The learning section 33 performs the learning by storing and updating the various kinds of parameters as the measurement values in the EEPROM 25a in relation to the fuel pressure p as of the injection start (hereafter, referred to simply as fuel pressure p). In the storing, the parameters as the measurement values calculated in the calculating section 32 are stored on maps M, each of which uses one of the injection rate model parameters and the fuel pressure p as axes. The map M is provided for each of the various kinds of injection rate model parameters (such as td, te and dqmax).

The injection command signal setting section 34 sets the injection command signal (t1, t2, Tq) to satisfy the request injection quantity and the request injection timing based on the injection rate model parameters (such as td, te and dqmax) learned by the learning section 33, the fuel pressure (injection start timing fuel pressure P1) supplied to the injector 10 and obtained based on the sensed pressure sensed with the fuel pressure sensor 20, and the request injection quantity and the request injection timing calculated based on the engine load and the like. The injector 10 operates according to the thus-set injection command signal and injects the fuel from the injection hole 11b.

Figure 4:
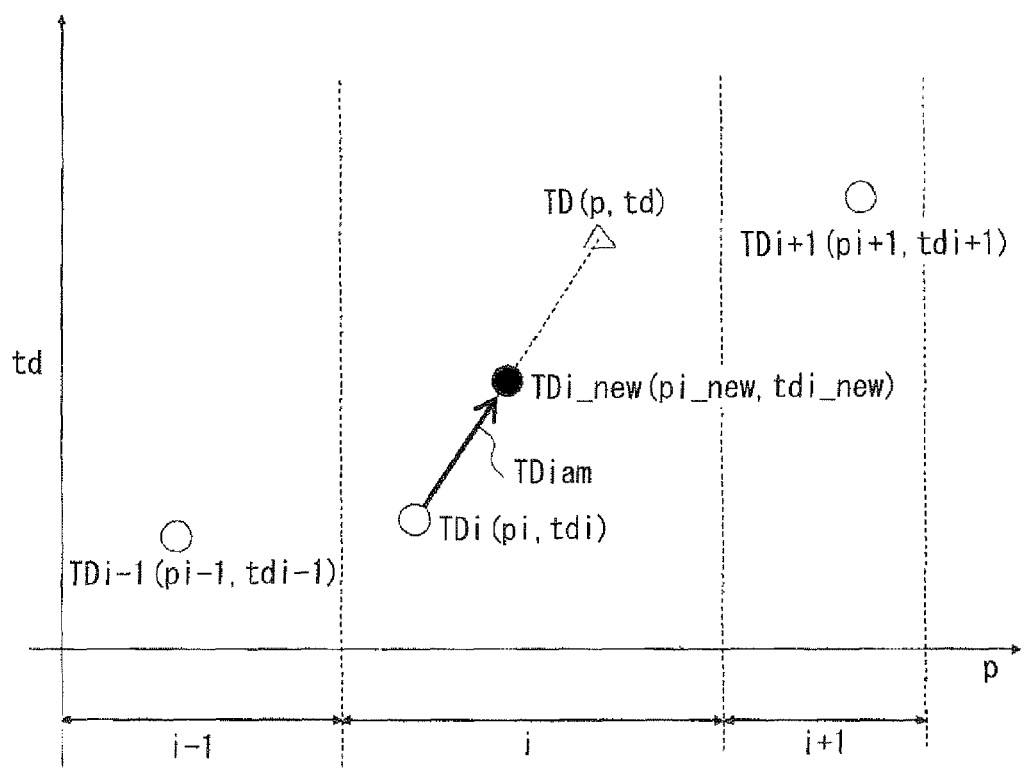
FIG. 4 is a diagram showing correction and updating of a learning vector according to the first embodiment.

Thus, the injection rate model parameters are calculated based on the sensed pressure obtained from the fuel pressure sensor 20, and the learning is performed by storing and updating the calculation values (measurement values) of the injection rate model parameters. The injection command signal of the next injection or later is set using the learning values of the injection rate model parameters. Thus, feedback control is performed to reduce a deviation between the required injection state and the actual injection state to zero, Next, a learning method of the injection rate model parameters will be explained by using the injection start delay td as an example. FIG. 4 shows the map M storing the delay td in relation to the fuel pressure p. The entire area of the map, whose vertical axis is the delay td and whose horizontal axis is the fuel pressure p, is segmented into multiple fuel pressure regions i−1, i, i+1. A single delay td is assigned to each of the regions i−1, i, i+1 and is stored and updated. In order to store the delay td in relation to the fuel pressure p, a learning vector consisting of the delay td and the fuel pressure p is defined, and the learning vector is stored and updated for each of the regions i−1, i, i+1.

For example, as shown in FIG. 4, the learning vector of the region i−1 is defined as TDi−1(pi−1, tdi−1), the learning vector of the region i is defined as TDi(pi, tdi), and the learning vector of the region i+1 is defined as TDi+1(pi+1, tdi+1). Therefore, the learning vector does not indicate the delay td corresponding to the specific fuel pressure p but indicates the delay td corresponding to arbitrary fuel pressure p in the region. Therefore, learning drive for driving the high-pressure pump 41 to achieve the specific fuel pressure p and for sensing the fuel pressure at the time with the fuel pressure sensor 20 is unnecessary in the present embodiment. Rather, in the present embodiment, the learning can be performed based on the fuel pressure sensing value at the time when the injection is performed according to the development of situation.

Then, when the parameter calculating section 32 calculates the delay td and the fuel pressure p as the measurement values based on the obtained sensed pressure, a measurement vector TD(p, td) consisting of the measurement values p, td is defined. When the fuel pressure p of the measurement vector TD(p, td) corresponds to the region i, the storing and the updating (learning) are performed by correcting the learning vector TDi(pi, tdi) of the region i based on the measurement vector TD(p, td).

Figure 5:
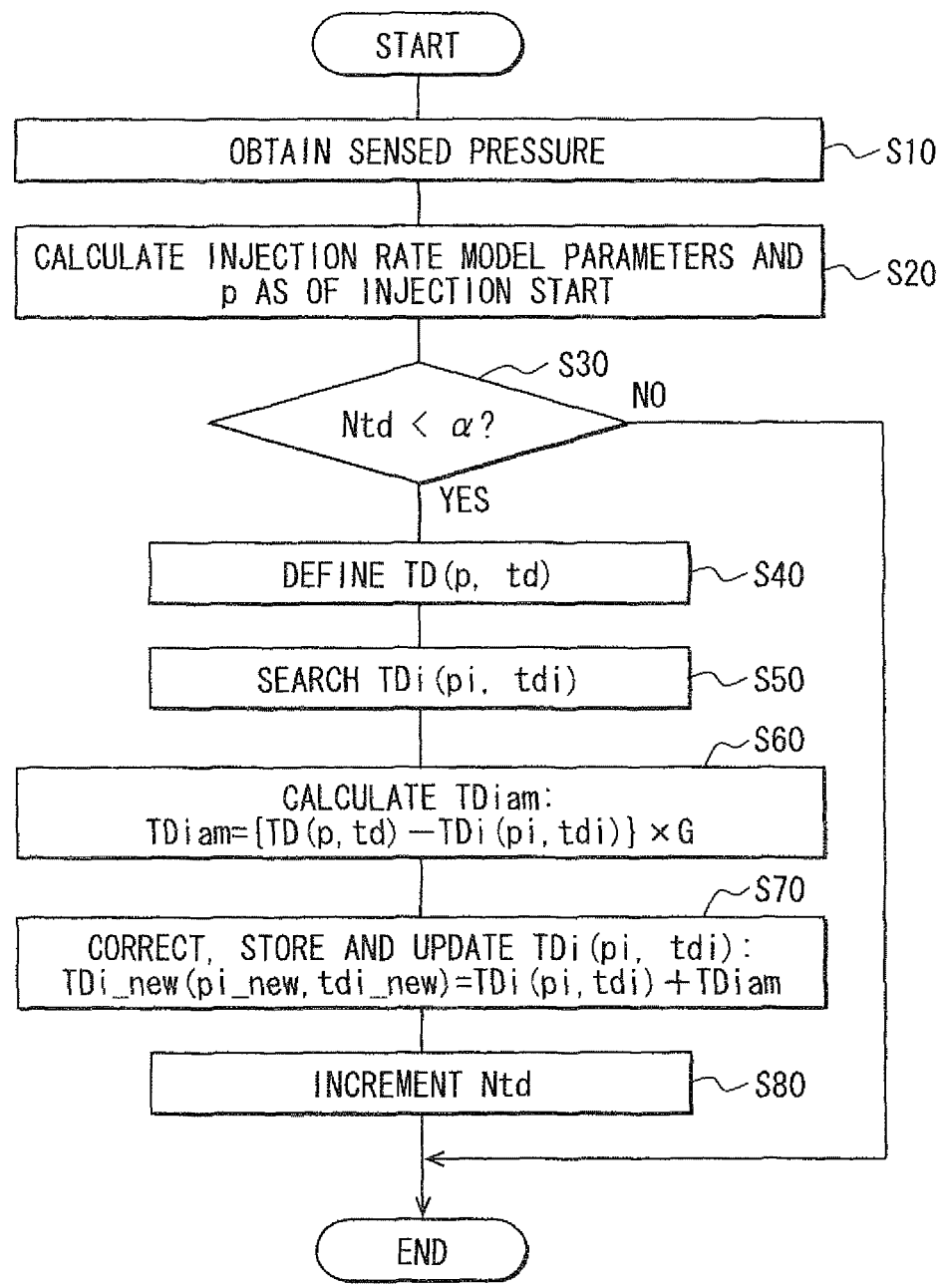
FIG. 5 is a flowchart showing a learning procedure according to the first embodiment.

Next, a learning procedure will be explained with reference to FIG. 5. FIG. 5 shows processing that is triggered by ignition-on (IG-ON) and repeatedly performed by the microcomputer of the ECU 30.

First, in S10 (S means "Step") (measurement vector obtaining section), the sensed pressure is obtained from the fuel pressure sensor 20. In following S20 (measurement vector obtaining section), the injection rate model parameters (such as td and te) and the fuel pressure p as of the injection start (P1 in part (c) of FIG. 2) are calculated. Hereafter, explanation will be given by using the delay td as an example of the injection rate model parameter. In following S30, it is determined whether the time number Ntd of the learning of the delay td is smaller than a predetermined time number $\alpha$.

If it is determined that the time number Ntd of the learning is equal to or larger than the predetermined time number a (S30: NO), it is determined that further learning is unnecessary, and the processing of FIG. 5 is ended. Thus, the learning processing load of the ECU 30 is reduced. If it is determined that the time number Ntd of the learning of the delay td is smaller than the predetermined time number a (S30: YES), the learning processing of the delay td is performed in subsequent S40 to S70.

First in S40, the vector consisting of the delay td and the fuel pressure p calculated in S20 is defined as the measurement vector TD(p, td). It can be regarded that the measurement vector TD(p, td) is obtained based on the fuel pressure measured with the fuel pressure sensor 20.

In following S50, the learning vector to be updated is searched based on the fuel pressure p calculated in S20. That is, the region out of the multiple segmented regions i−1, i, i+1 corresponding to the fuel pressure p is searched and the learning vector assigned to the searched region is selected as the learning vector to be updated. In the example of FIG. 4, the measurement vector TD(p, td) shown by a triangle mark is obtained. The fuel pressure p as the element of the measurement vector TD(p, td) corresponds to the region i. Therefore, the learning vector TDi(pi, tdi) of the region i shown by a circle mark is selected as the learning vector to be updated.

In following S60 (correction vector calculating section (correcting section)), a correction vector TDiam is calculated based on the learning vector TDi(pi, tdi) to be updated and the measurement vector TD(p, td). More specifically, the learning vector TDi(pi, tdi) to be updated is subtracted from the measurement vector TD(p, td), and the result of the subtraction is multiplied by a predetermined ratio G (0<G<1) to obtain the correction vector TDiam. That is, the correction vector TDiam is calculated by a formula: TDiam={TD(p, td)−TDi(pi, tdi)}×G.

The predetermined ratio G according to the present embodiment is set at the same value in any regions. Alternatively, the predetermined ratio G may be set at different values among the different regions. For example, the predetermined ratio G may be set at a relatively large value when the time number of the learning is relatively small. Thus, the learning vector can be quickly approximated to the true values, and hunting of the learning vector can be inhibited when the learning vector approximates to the true values to a certain degree. The predetermined ratio G according to the present embodiment is set at a preset fixed value. Alternatively, the predetermined ratio G may be set variably. For example, the value of the predetermined ratio G may be set variably according to the time number of the learning.

In following S70 (correcting section), the correction vector TDiam calculated in S60 is added to the learning vector TDi(pi, tdi) to be updated. Thus, the learning vector TDi(pi, tdi) of the region i is corrected and stored, and updated. That is, the updated learning vector TDinew(pinew, tdinew) is calculated by a formula: TDinew(pinew, tdinew)=TDi(pi, tdi)+TDiam.

In following S80, a counter for counting the time number Ntd of the learning used for the determination in S30 is incremented. In above-described S30, the time number Ntd of the learning of td of the entire regions is determined. Alternatively, the time number of the learning may be counted for each region and it may be determined whether the time number of the learning is smaller than a predetermined time number for each region. In this case, the learning time number counter of the region corresponding to the learning vector updated in S70 is incremented in S80.

The present embodiment described above exerts following effects.

Figure 7A:
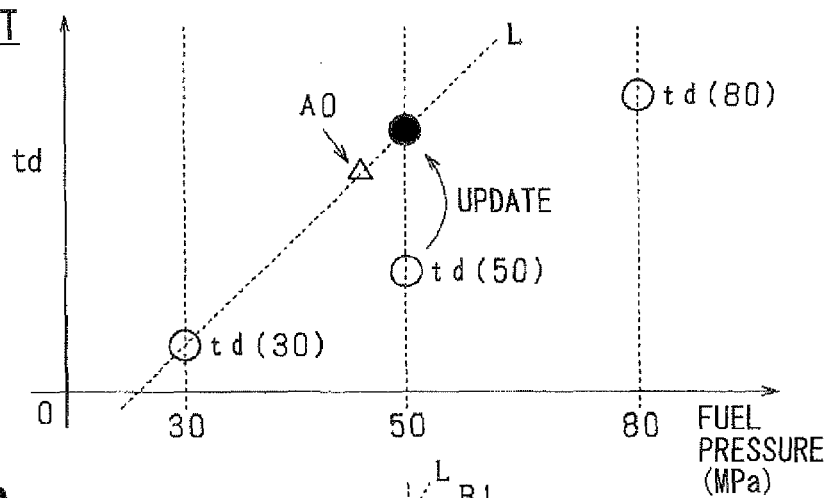
FIGS. 7A and 7B are diagrams showing a learning method of a related art.
Figure 7B:
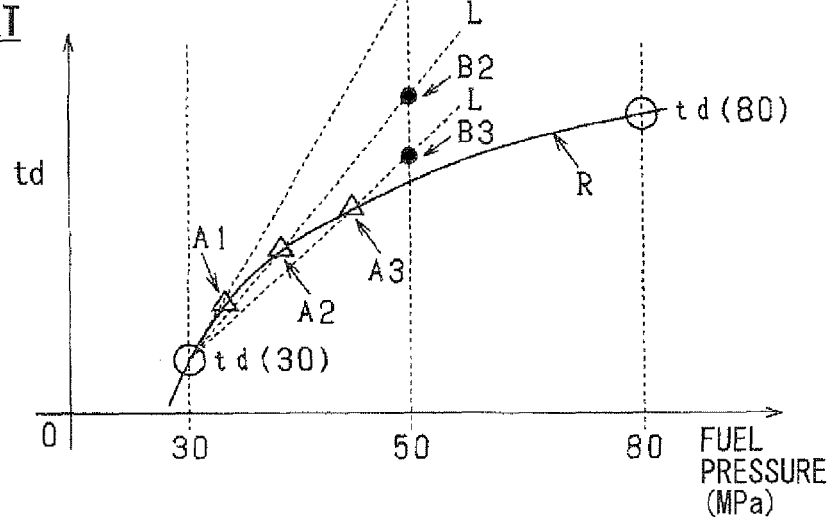

(1) In the present embodiment, the response delay td (td(30), td(50), td(80) in example of FIG. 7) corresponding to the specific value of the fuel pressure p (30 MPa, 50 MPa, 80 MPa in example of FIG. 7) is not stored. Rather, in the present embodiment, the learning vector consisting of the response delay td and the fuel pressure p (TDi−1, TDi and TDi+1 in example of FIG. 4) are stored. The learning vector is corrected based on the measurement vector (TD in example of FIG. 4) consisting of the measurement value of the response delay td and the measurement value of the fuel pressure p as of the injection start timing. Therefore, even if the characteristic expressing the relationship between the response delay td and the fuel pressure p is not the straight line but the curve line, the hunting of the stored and updated values of the learning vector can be inhibited.

Moreover, even if the characteristic is the straight line and the present learning vector TDi has deviated from the true characteristic values, the updated learning vector TDinew gradually approximates to the true values without hunting as the correction of the present learning vector TDi is repeated based on the measurement vector TD. Therefore, also in this case, the hunting of the stored and updated values of the learning vector TDinew can be inhibited.

(2) The correction vector TDiam is calculated by multiplying the difference between the measurement vector TD and the learning vector TDi by the predetermined ratio G, which is set between 0 and 1. Therefore, the hunting of the stored and updated values of the learning vector can be inhibited as compared to the case where the correction is performed by adding the difference to the learning vector TDI as it is.

(3) If the time number of the learning of the delay td is equal to or larger than the predetermined time number (S30: NO), it is regarded that further learning is unnecessary. Then, the processing of FIG. 5 is ended without performing the calculation processing of the measurement vector (S40), the calculation processing of the correction vector (S60), the storing and updating processing of the learning vector (S70) and the like. Therefore, excessively frequent learning can be avoided and the learning processing load of the ECU 30 can be reduced.

(Second Embodiment)

Next, a second embodiment of the present invention will be explained.

In the above-described first embodiment, the predetermined ratio G used for the calculation of the correction vector TDiam is set at the same value in all the regions i−1, i, i+1. In the second embodiment, the predetermined ratio G is set at different values among the regions i−1, i, i+1.

For example, the predetermined ratio G is set variably in accordance with the learning time number. It is assumed that the learning vector in a certain region has approximated to the true values more as the learning time number of the certain region increases. Therefore, the predetermined ratio G of a certain region may be set variably to be smaller as the learning time number of the certain region increases.

It is assumed that the learning time number of the entire regions increases as an elapsed time after a first use of the injector 10 as the controlled object lengthens. Therefore, it may be regarded that the learning vectors have approximated to the true values in the entire regions more and the predetermined ratios G may be decreased in the entire regions as the elapsed time lengthens.

(Third Embodiment)

Next, a third embodiment of the present invention will be explained.

In the above-described first embodiment, the entire range of the fuel pressure p is segmented at equal intervals. In the third embodiment, the multiple regions i−1, i, i+1 are segmented at different intervals (refer to Wi, Wi+1 in FIG. 6).

That is, as a first example, the multiple regions i−1, i, i+1 are segmented at different intervals (refer to Wi, Wi+1 in FIG. 6) according to a distribution profile of the multiple learning vectors TDi−1, TDi, TDi+1 in the map area.

Figure 6:
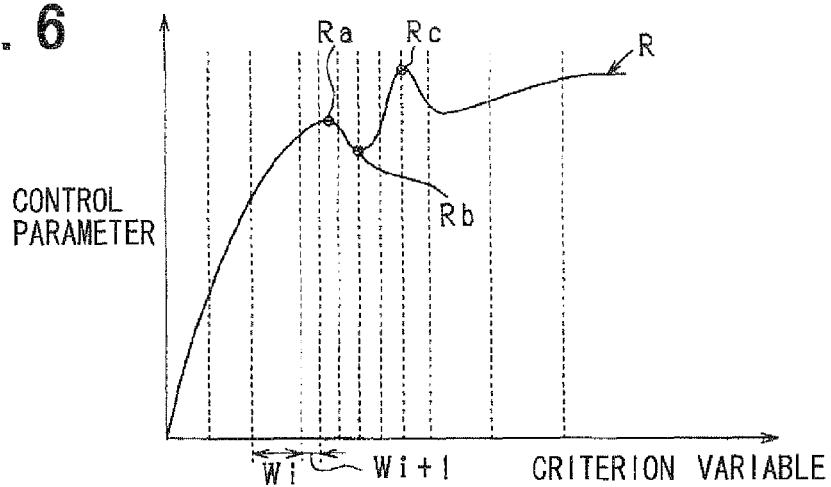
FIG. 6 is a diagram showing segmented regions of fuel pressure (criterion variable) according to a third embodiment of the present invention.

For example, in the case where the distribution profile of the learning vector has a shape shown by a mark R in FIG. 6, it is assumed that a distribution of the true values also has a shape of a curve line in a region, where the distribution profile R of the learning vector has a shape of a curve line (e.g., region Wi+1). Therefore, the interval in the region of the curve line is set smaller than in another region of a straight line (e.g., region Wi in FIG. 6). Alternatively, since it is assumed that the distribution of the true values also has a shape including an extreme value in a region near an extreme value (Ra, Rb, Rc in FIG. 6) of the distribution profile R, the interval in the region may be set small. With these configurations, the learning vector is stored and updated finely in the region where the true values change rapidly. Therefore, the learning vector can be approximated to the true values with high accuracy.

When the injection command signal setting section 34 sets the injection command signal (t1, t2, Tq) using the injection rate model (i.e., learning map M) calculated based on the learned injection rate model parameters (such as td, te and dqmax), the use frequencies of the learning vectors TDi−1, TDi, TDi+1, which are stored for the regions i−1, i, i+1 in the map M respectively, for setting the injection command signal differ from each other among the regions. Therefore, as a second example, the multiple regions i−1, i, i+1 are segmented at different intervals according to the use frequencies. For example, the learning vector corresponding to the fuel pressure as of idling of the internal combustion engine is used frequently. Therefore, it is preferable to set the interval to be small in such the region of the fuel pressure.

(Fourth Embodiment)

Next, a fourth embodiment of the present invention will be explained.

In the above-described first embodiment, the map area using the injection rate model parameter (control parameter) such as td, te or dqmax and the fuel pressure p (criterion variable) as the axes is segmented into the multiple regions i−1, i, i+1. The single learning vector is assigned to each of the segmented regions i−1, i, i+1. In the fourth embodiment, the map area using the injection rate model parameter and the fuel pressure p as the axes is not segmented into multiple regions. Rather, in the present embodiment, the existing learning vector closest to the obtained measurement vector TD is selected as the object of the update and is corrected based on the measurement vector TD. The corrected learning vector is stored and updated.

For example, in the example of FIG. 4, though the measurement vector TD exists in the region i in the first embodiment, the learning vector TDi+1 in the region i+1 is closer to the measurement vector TD than the learning vector TDi in the region i is. In such the case, not the learning vector TDi but the learning vector TDi+1 is corrected based on the measurement vector TD and stored and updated in the present embodiment.

Therefore, according to the present embodiment, the learning vectors gather into the region in the map area where the measurement vector TD is measured frequently. Eventually, the number of the learning vectors automatically increases in the region where the measurement frequency is high.

(Fifth Embodiment)

Next, a fifth embodiment of the present invention will be explained.

In the above-described fourth embodiment, the number of the learning vectors existing in the map area is fixed to a fixed number. In the fifth embodiment, in addition to selecting the learning vector closest to the measurement vector TD as the target of the update like the fourth embodiment, the number of the learning vectors existing in the map area is set variably.

As a first example, the number of the learning vectors is set variably to increase the number of the learning vectors in the region where the distribution profile R of the learning vector has the shape of a curve line, the region near the extreme value Ra, Rb or Rc, or the region where the use frequency is high as explained above using FIG. 6.

As a second example, when a distance between the two adjacent learning vectors is equal to or smaller than a predetermined value, either one of the adjacent learning vectors is erased. Thus, variable setting is performed to reduce the number of the learning vectors. In this way, when the distance between the adjacent learning vectors is short, it is regarded that the number of the learning vectors is unnecessarily large, and either one of the adjacent learning vectors is erased. Therefore, the necessary or used storage capacity of the EEPROM 25a can be reduced.

As a third example, when the distance between the adjacent learning vectors is equal to or smaller than a predetermined value, a new learning vector is added between the adjacent learning vectors. Thus, variable setting is performed to increase the number of the learning vectors. In this way, when the distance between the adjacent learning vectors is short, it is assumed that the use frequency is high in the region, and the new learning vector is added. Therefore, the learning vector can be stored and updated finely in the region of the high use frequency.

(Sixth Embodiment)

Next, a sixth embodiment of the present invention will be explained.

In the above-described first embodiment, the learning map M is produced by using the stored and updated learning vector as it is, and the injection command signal (t1 t2, Tq) is set based on the learning map M. In the sixth embodiment, the value of the delay td (control parameter) corresponding to the specific value (for example, 30 MPa, 50 MPa, 80 MPa in FIG. 7) of the fuel pressure p (criterion variable) is calculated by linear interpolation based on the already-learned learning vector. A control map is produced by relating the calculated value to the specific value. Then, the injection rate model is calculated and the injection command signal is set using the delay td stored in the control map.

The learning is performed on the learning map M shown in FIG. 4, but the learning map M is not used as the control map, which is used for setting the injection command signal, as it is. Rather, the map in the form shown in FIG. 7 is produced from the learning map and is used.

(Other Embodiments)

The present invention is not limited to the above-described embodiments but may be modified and implemented as follows, for example. Further, characteristic constructions of the respective embodiments may be combined arbitrarily.

In the above-described embodiments, the learning map relating each of the injection rate model parameters (such as td, te and dqmax) to the fuel pressure p is produced. That is, the two-dimensional learning vector consisting of the single injection rate model parameter and the fuel pressure p is defined, and the learning vector is stored in the two-dimensional learning map. Alternatively, a multidimensional learning vector of three or more dimensions consisting of the multiple injection rate model parameters and the fuel pressure p may be defined, and the multidimensional learning vector may be stored in a multidimensional learning map of the three or more dimensions.

For example, when the three-dimensional learning vector consisting of the response delay td, the injection time deviation te and the fuel pressure p is defined, the learning is performed like the processing of FIG. 5. That is, the measurement vector is defined as TD(p, te, td), and the correction vector TDiam is calculated by a formula: TDiam={TD(p, te, td) TDi(pi, tei, tdi)}×G. Then, the updated learning vector TDinew(pinew, teinew, tdinew) is calculated by a formula: TDinew(pinew, teinew, tdinew)=TDi(pi, tei, tdi)+TDiam. Thus, it is only required to change the dimension of each calculation formula. Therefore, the present invention can be applied to the multiple control parameters without necessitating a significant program change.

In the above-described embodiments, the learning values of the injection rate model parameters (control parameters) are stored in the EEPROM 25a mounted in the injector 10. Alternatively, the learning values may be stored in a memory 31 of the ECU 30.

In the above-described embodiments, the predetermined ratio G used for calculating the correction vector TDiam is smaller than 1. Alternatively, the predetermined ratio G may be set at 1. That is, the vector obtained by subtracting the learning vector TDi(pi, tdi) as the object of the update from the measurement vector TD(p, td) may be used as the correction vector TDiam as it is.

In the above-described first embodiment, the learning is ended on a condition that the time number of the learning is equal to or larger than the predetermined time number in S30 of FIG. 5. Alternatively, the learning may be ended on a condition that a learning period of the learning vectors exceeds a predetermined period.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A learning device that learns a control parameter, which is used for deciding a control content of a controlled object, in relation to a criterion variable, the learning device comprising:

a storing means for storing at least one learning vector consisting of the control parameter and the criterion variable;

a measurement vector obtaining means for obtaining a measurement vector consisting of a measurement value of the control parameter and measurement value of the criterion variable; and a correcting means for correcting the learning vector based on the measurement vector and for performing storing and updating of the learning vector in the storing means; wherein the correcting means includes a correction vector calculating means for calculating a correction vector by multiplying a difference between the obtained measurement vector and the learning vector by a predetermined ratio, and the correcting means performs the storing and the updating of the learning vector by adding the correction vector to the learning vector yet to be learned.

2. The learning device as in claim 1, wherein the predetermined ratio is set variably in accordance with a time number of the learning.

3. The learning device as in claim 1, wherein the predetermined ratio is set variably in accordance with an elapsed time after the controlled object is started up.

4. A learning device that learns a control parameter, which is used for deciding a control content of a controlled object, in relation to a criterion variable, the learning device comprising:

a storing means for storing at least one learning vector consisting of the control parameter and the criterion variable;

a measurement vector obtaining means for obtaining, a measurement vector consisting of a measurement value of the control parameter and a measurement value of the criterion variable; and a correcting means for correcting the learning vector based on the measurement vector and for performing storing and updating of the learning vector in the storing means; wherein a map area using the control parameter and the criterion variable as axes is segmented into a plurality of regions, one of the learning vectors is assigned to each of the segmented regions, and the correcting means corrects the learning vector of the region corresponding to the obtained measurement vector, thereby performing the storing and the updating of the learning vector.

5. The learning device as in claim 4, wherein the plurality of regions are segmented at different intervals according to a distribution profile of the learning vectors in the map area.

6. The learning device as in claim 4, wherein the plurality of regions are segmented at different intervals according to frequencies of use of the learning vectors in the decision of the control content.

7. The learning device as in claim 4, wherein the plurality of regions are segmented at equal intervals.

8. A learning device that learns a control parameter, which is used for deciding a control content of a controlled object, in relation to a criterion variable, the learning device comprising:

a storing means for storing at least one learning vector consisting of the control parameter and the criterion variable:

a measurement vector, obtaining means for obtaining a measurement vector consisting of a measurement value of the control parameter and a measurement value of the criterion variable; and a correcting means correcting the learning vector based on the measurement vector and for performing storing and updating of the learning vector in he storing means: wherein the correcting means corrects the learning vector closest to the obtained measurement vector to perform the storing and the updating of the learning vector in a map area that uses the control parameter and the criterion variable as axes.

9. A learning device that learns control parameter, which is Used for deciding a control content of a controlled object, in relation to a criterion variable, the learning device comprising;

a storing means for storing at least one learning vector consisting of the control parameter and the criterion variable;

a measurement vector obtaining means for obtaining a measurement vector consisting of a measurement value of the control parameter and a measurement value criterion variable: and a correcting means for correcting the learning vector based on the measurement vector and for performing storing and updating of the learning vector in the storing means; wherein the number of the learning vectors is set variably in a map area that uses the control parameter and the criterion variable as axes.

10. The learning device as in claim 9, wherein the number of the learning vectors is set variably according to a distribution profile of the learning vectors in the map area.

11. The learning device as in claim 9, wherein the number of the learning vectors is set variably according to frequencies of use of the learning vectors in the decision of the control content.

12. The learning device as in claim 9, wherein when a distance between the adjacent learning vectors is equal to or smaller than a predetermined value, either one of the adjacent learning vectors is erased.

13. The learning device as in claim 9, wherein when a distance between the adjacent learning vectors is equal to or smaller than a predetermined value, a new learning vector is added between the adjacent learning vectors.

14. A learning device that learns a control parameter, which is used for deciding a control content of a controlled object, in relation to a criterion variable, the learning device comprising:

a storing, means for storing at least one learning vector consisting of the control parameter and the criterion variable;

a measurement vector obtaining means for obtaining a measurement vector consisting of a measurement value of the control ,parameter and a measurement value of the criterion variable; and a correcting means for correcting the learning vector based on the measurement vector and for performing storing and updating of the learning vector in the storing means; wherein the learning of the learning vector, whose storing and updating have been performed by a predetermined time number or over, is ended.

15. A learning device that learns a control parameter, which is used for deciding a control content of a controlled object in relation to a criterion variable, the learning device comprising:

a storing means for storing at least one learning vector consisting of the control parameter and the criterion variable;

a measurement vector obtaining means for obtaining a measurement vector consisting of a measurement value of the control parameter and a measurement value of the criterion variable; and a correcting means for correcting the learning vector based on the measurement vector and for performing storing ,and updating of the learning vector in the storing means; wherein the learning of all the learning vectors is ended when a learning period of the learning vectors exceeds a predetermined period.

16. A learning device that learns a control parameter, which is used for deciding a control content of a controlled object, in relation to a criterion variable, the learning device comprising:

a storing means for Storing at least one learning vector consisting of the control parameter and the criterion variable;

a measurement vector obtaining means for obtaining a measurement vector consisting of a measurement value of the control parameter and a measurement value of the criterion variable; and a correcting means for correcting, the learning vector based on the measurement vector and for performing storing and updating of the learning vector in the storing means: wherein a value of the control parameter corresponding to a specific value of the criterion variable is calculated by linear interpolation based on the learning vector, whose learning has been completed, a control map is produced by relating the calculated value to the specific value, and the control content is decided using the control parameter stored in the control map.

17. A learning device that learns a control parameter, which is used for deciding a control content of a controlled object, in relation to a criterion variable, the learning device comprising:

a storing means for storing at least one learning vector consisting of the control parameter and the criterion variable;

a measurement vector obtaining means for obtaining a measurement vector consisting of a measurement value of the control parameter and a measurement value of the criterion variable; and a correcting means for correcting the learning vector based on the measurement vector and for performing storing and updating of the learning vector in the storing means: wherein a control map is produced by relating a value of the control parameter of the learning vector, whose learning has been completed, to the criterion variable of the same learning vector, and the control content is decided using the control parameter stored in the control map.

18. A learning device that learns a control parameter, which is used for deciding a control content of a controlled object, in relation to a criterion variable, the learning device comprising:

a storing means for storing at least one learning vector consisting of the control parameter and the criterion variable;

a measurement vector obtaining means for obtaining a measurement vector consisting of a measurement value of the control parameter and a measurement value of the criterion variable; and a correcting means for correcting the learning vector based on the measurement vector and for performing storing and updating of the learning vector in the storing means; wherein the learning vector is a vector of three or more dimensions consisting of a plurality of control parameters and the criterion variable.

19. A learning device that learns a control parameter, which is used for deciding a control content of a controlled object, in relation to a criterion variable, the learning device comprising;

a storing means for storing at least one learning vector consisting of the control parameter and the criterion variable;

a measurement vector obtaining means for obtaining a measurement vector consisting of a measurement value of the control parameter and a measurement value of the criterion variable; and a correcting means for correcting the learning vector based on the measurement vector and for performing storing and updating of the learning vector in the storing means: wherein the controlled object is an injector that injects fuel used for combustion in an internal combustion engine, a fuel pressure sensor for sensing fuel pressure is mounted to the injector, and the measurement vector obtaining means obtains a parameter, which quantifies an injection characteristic of the injector, as the control parameter based on a sensing value of the fuel pressure sensor.

* * * * *